(12) United States Patent
Dageville et al.

(10) Patent No.: US 8,606,744 B1
(45) Date of Patent: Dec. 10, 2013

(54) PARALLEL TRANSFER OF DATA FROM ONE OR MORE EXTERNAL SOURCES INTO A DATABASE SYSTEM

(75) Inventors: Benoit Dageville, Foster City, CA (US); Allen Brumm, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1683 days.

(21) Appl. No.: 10/159,812

(22) Filed: May 31, 2002

Related U.S. Application Data

(63) Continuation-in-part of application No. 09/968,067, filed on Sep. 28, 2001, now abandoned.

(60) Provisional application No. 60/326,739, filed on Oct. 2, 2001, provisional application No. 60/379,072, filed on May 8, 2002.

(51) Int. Cl.
    *G06F 7/00* (2006.01)
(52) U.S. Cl.
    USPC .......................................................... 707/602
(58) Field of Classification Search
    CPC ................................................. G06F 17/30592
    USPC ......... 707/3, 203, 1, 602, 713, 607, 609, 802, 707/756, 975, 809; 718/105
    See application file for complete search history.

(56) References Cited

U.S. PATENT DOCUMENTS

| 4,506,326 | A | 3/1985 | Shaw et al. |
| 4,930,071 | A | 5/1990 | Tou et al. |
| 5,222,235 | A | 6/1993 | Hintz et al. |
| 5,396,623 | A | 3/1995 | McCall et al. |
| 5,579,516 | A | 11/1996 | Van Maren et al. |
| 5,701,461 | A | 12/1997 | Dalal et al. |
| 5,781,911 | A | 7/1998 | Young et al. |
| 5,819,254 | A | 10/1998 | Kawai |
| 5,819,298 | A | 10/1998 | Wong et al. |
| 5,870,746 | A | 2/1999 | Knutson et al. |
| 5,890,167 | A | 3/1999 | Bridge, Jr. et al. |
| 5,890,169 | A | 3/1999 | Wong et al. |

(Continued)

FOREIGN PATENT DOCUMENTS

| EP | 0 992 909 A2 | 4/2000 |
| WO | WO 02/05116 A2 | 1/2002 |
| WO | WO 02/097676 A2 | 12/2002 |

OTHER PUBLICATIONS

R. Hugo Patterson, Garth A. Gibson, Eka Ginting, Daniel Stodolsky, Jim Zelenkat, Informed Prefetching and Caching, 1995, ACM, pp. 79-95.*

(Continued)

*Primary Examiner* — Kandasamy Thangavelu
*Assistant Examiner* — Luke Osborne
(74) *Attorney, Agent, or Firm* — Hickman Palermo Truong Becker Bingham Wong LLP

(57) ABSTRACT

Embodiments of the invention enable data to be moved from one or more external sources into a database system. A plurality of processes are executed concurrently. Each of the processes are executable to move data from at least a portion of the one or more external sources into the database system, so that executing the plurality of processes concurrently moves data from different portions of the one or more external sources into the database system in parallel. Execution of the plurality of processes are coordinated from the database system.

31 Claims, 10 Drawing Sheets

(56) References Cited

U.S. PATENT DOCUMENTS

| | | | |
|---|---|---|---|
| 5,924,097 A * | 7/1999 | Hill et al. .................. 707/10 |
| 6,035,412 A | 3/2000 | Tamer et al. |
| 6,044,374 A | 3/2000 | Nesamoney et al. |
| 6,078,924 A | 6/2000 | Ainsbury et al. |
| 6,108,659 A | 8/2000 | Vincent |
| 6,151,601 A | 11/2000 | Papierniak et al. |
| 6,151,608 A | 11/2000 | Abrams |
| 6,208,990 B1 * | 3/2001 | Suresh et al. .................. 707/6 |
| 6,434,558 B1 | 8/2002 | MacLeod et al. |
| 6,442,568 B1 | 8/2002 | Velasco et al. |
| 6,490,590 B1 | 12/2002 | Fink |
| 6,604,104 B1 | 8/2003 | Smith |
| 6,604,110 B1 | 8/2003 | Savage et al. |
| 6,611,838 B1 | 8/2003 | Ignat et al. |
| 6,643,652 B2 | 11/2003 | Helgeson et al. |
| 6,691,155 B2 | 2/2004 | Gottfried |
| 6,721,727 B2 | 4/2004 | Chau et al. |
| 6,721,749 B1 | 4/2004 | Najm et al. |
| 6,757,689 B2 | 6/2004 | Battas et al. |
| 6,920,443 B1 | 7/2005 | Cesare et al. |
| 7,031,987 B2 | 4/2006 | Mukkamalla et al. |
| 7,051,334 B1 | 5/2006 | Porter et al. |
| 7,103,590 B1 | 9/2006 | Murthy et al. |
| 7,296,238 B1 | 11/2007 | Zurawski |
| 2001/0016843 A1 | 8/2001 | Olson et al. |
| 2001/0047270 A1 | 11/2001 | Gusick et al. |
| 2001/0047372 A1 | 11/2001 | Gorelik et al. |
| 2002/0046301 A1 | 4/2002 | Shannon et al. |
| 2002/0073139 A1 | 6/2002 | Hawkins et al. |
| 2002/0116213 A1 | 8/2002 | Kavounis et al. |
| 2002/0138316 A1 * | 9/2002 | Katz et al. .................. 705/7 |
| 2002/0174000 A1 | 11/2002 | Katz et al. |
| 2002/0174093 A1 | 11/2002 | Casati et al. |
| 2003/0236834 A1 | 12/2003 | Gottfried |

OTHER PUBLICATIONS

Oracle Corporation, "Oracle9*i* Application Server: Business Intelligence Technical Overview," Jun. 2003, an Oracle White Paper, http://otn.oracle.com/products/bi/pdf/bi_overview.pdf, pp. 1-13.

Oracle Corporation, "ETL Processing with Oracle9*i*," Jun. 2001, An Oracle White Paper, http://otn.oracle.com/products/bi/pdf/bi_overview.pdf, pp. 1-18.

Oracle Corporation, "Oracle9*i* for e-Business: Business Intelligence," Jun. 2001, An Oracle White Paper, http://otn.oracle.com/products/oracle9i/pdf/o9i_bi_twp.pdf, pp. 1-18.

Oracle Corporation. "Oracle 9*i* Warehouse Builder, Architectural White paper" Jan. 2003, http://otn.oracle.com/products/warehouse/pdf/OWB_Architecture_WhitePaper.pdf, pp. 1-16.

Current Claims in PCT application, International Application No. PCT/US03/23747, 14 pages.

International Searching Authority, "Notification of Transmittal of the International Search Report or the Declaration," dated May 25, 2004, 6 pages.

Kei Kurakawa et al., "Life Cycle Design Support Based on Environmental Information Sharing," IEEE, Feb. 1-3, 1999, Proceedings EcoDesign '99, First International Symposium, pp. 138-142.

Oliver Gunther, et al., "MMM: A Web-Based System for Sharing Statistical Computing Modules," IEEE, May-Jun. 1997, vol. 1, Issue 3, pp. 59-68.

Current Claims of International Application No. PCT/US2004/025805, 8 pages.

International Searching Authority, "Notification of Transmittal of the International Search Report and the Written Opinion of the International Searching Authority, or the Declaration," dated Dec. 3, 2004, 12 pages.

Database Journal, "Oracle—Datawarehousing (ETL) Enhancements in Oracle 9i", dated Aug. 20, 2001, Copyright 2007 Jupitermedia Corporation, 5 pages.

Bernhard Atzenberger, et al., "Data Warehouse Performance Enhancements with Oracle9i", Oracle Corporation, Apr. 2001, 36 pages.

* cited by examiner

PARALLEL TRANSFER OF DATA FROM ONE OR MORE EXTERNAL SOURCES INTO A DATABASE SYSTEM

CROSS-REFERENCED APPLICATIONS

The application claims benefit of priority to U.S. Provisional Patent Application No. 60/326,739, filed Oct. 2, 2001, entitled "Implementing An ETL Toolkit In A Database System," naming Allen Brumm and Benoit Dageville as inventors, the aforementioned application being hereby incorporated by reference in its entirety. This application also claims benefit of priority to U.S. Provisional Patent Application No. 60/379,072, filed May 8, 2002, entitled "Automatic Parallel Access Of External Data Via External Tables," naming Allen Brumm, Benoit Dageville, Thierry Cruanes, James Stenoish, Jay Davidson as inventor, the aforementioned application being hereby incorporated by reference. This application is also a continuation-in-part of U.S. patent application Ser. No. 09/968,067, filed on Sep. 28, 2001, now abandoned entitled "Technique For Moving Data Into A Database System," naming Patrick Amor, Benoit Dageville, Cetin Ozbutun, Raymond Roccaforte, Leng-Leng Tan, and William Waddington, as inventors, the aforementioned application being hereby incorporated by reference in its entirety.

FIELD OF THE INVENTION

The present invention relates to database systems. In particular, the present invention relates to parallel transfer of data from one or more external sources into a database system.

BACKGROUND OF THE INVENTION

Warehouses are central databases that can be used to store data from many other data sources. A warehouse may store data from other databases, servers, work stations, storage disks or other storage mediums. The warehouse provides a central location for operators and users to analyze data that would otherwise be scattered across multiple, discrete storage mediums. For example, a warehouse enables operators and users to study historical data for purpose of running business logic or models. The historical data may have, at one time, been recorded on individual computer machines that could not easily share large amounts of stored information with one another.

Extraction, transformation and loading (ETL) procedures are used to move data from scattered sources into a target warehouse. Typically, ETL operations are performed externally to the target warehouse. The extraction procedure is executed to retrieve data from one or more data sources. The transformation procedure is used to alter the extracted data, and may involve performing operations, conversions and/or other functions on the data. The loading process is used to move the transformed data into the target warehouse.

Current systems implement ETL operations in tools that are external to the target warehouse. Vendors that provide tools to perform ETL operations are often different than those who provide the warehouse.

FIG. 6 illustrates a system 1000 for moving data from scattered data sources into a target database system. The system 1000 includes components for performing ETL operations. The system 1000 typically includes a target database system 1020, and an intermediate tool 1030. The system 1000 is used to move data from data sources 1010 into target database system 1020. The tool 1030, which resides on a computer system 1040, is external to the target database system 1020. The computer system 1040 and database system 1020 may be different machines.

Based on input from a user, the tool 1030 identifies data that is to be moved from data sources 1010. The identified data is moved using a transport mechanism. The identified data may be moved to computer system 1040, where it is staged. The tool 1030 then performs one or more transformation functions T(x) on the data collected from data sources 1010. The transformed data is staged again in computer system 1040. After being staged, the transformed data is then loaded into target database system 1020.

Some variations to the traditional ETL technique exist. In one variation, intermediate steps such as staging, may be performed within the target database system 1020. This may involve moving data directly from the data sources 1010 into target database system 1020. The tool 1030 may access the data from the target database system 1020 in order to perform one or more transformations on the data. The transformed data is then loaded into one or more final destinations within the target database system 1020. This allows the tool 1030 to use the target database 1020 as an intermediate staging area.

The use of external tools for performing ETL operations requires interoperability considerations between target database system 1020 and tool 1030. For example, tool 1030 may be provided by one vendor, and target database system 1020 may be provided by another vendor. Providing interoperability may be costly, may require custom programming, and may be prone to error.

In addition, repeated staging of extracted data may be required in order to convert the extracted data into a database format for target database system 1020. It is possible for existing systems to move data from data sources 1020 into the target database 1010 without externally staging the data. In one system, tool 1030 moves raw data from multiple data sources 1010 into target database system 1020. The raw data is staged internally in the target database system 1020. After the data is staged, the user may instruct the database to perform one or more transformations on the data. The database system then integrates the transformed data into a table data structure.

In this kind of system, the target database 1020 typically interacts with an external engine in order to perform one or more steps of moving, transforming and storing the data. Steps for performing transformation and integration of the collected data are usually specified by the instructions provided by the user. The user may send remote procedure calls (RPCs) to invoke routines for performing specific transformation operations. The routines thus invoked may also cause the extracted data to be loaded into the target database system 1020 from the staging area.

Often, each transformation performed on the collected data requires the output of the transformation to be staged. If multiple transformations are required, repeated staging of the collected data is required. The data may also need to be staged prior to being stored in the target database system 1020. Repeated staging of the data collected from the data sources 1010 takes up a significant amount of the target database system's resources.

Many existing systems that perform ETL operations generally do not provide for parallel transfer of data into the target database system. Rather, such systems load data into the target database system sequentially or serially. For example, the process of loading one or more external tables into the target database system may be achieved by sequentially transferring data from each table in a row-wise fashion. As a result, the time to perform ETL operations is directly dependent on the size of the data being transferred in.

Some database systems are able to receive external data in parallel during ETL operations. In such scenarios, the external data is typically "pushed" into the target database system from multiple external data sources. Usually, an external ETL tool (such as shown by numeral 630 in FIG. 6) or clients of the target database system initiate the request to load the data in parallel. The external data is loaded into the target database system through the control of some system that is external to the target database system, such as by the external ETL tool.

When systems external to the target database system load external data into the target database system in parallel during ETL operations, the target database system is not able to coordinate the transfer of data that it receives. As a result, some problems may arise. For example, multiple data items received from external sources in parallel may be designated for the same internal location within a database of the target database system. Some current database systems use temporary storage to address such contention among data items being loaded into the target database system. But temporary storage of data during ETL operations can cause fragmentation of the data being transferred into the target database system.

Furthermore, the mechanism(s) used in current ETL systems to load data in parallel into the target database system may transfer some portions of the external data faster than other portions. As a result, queues may form where one portion of the overall external data is loaded into the target database system slower than other portions. If different mechanisms or processes are used to load data into the target database system, then the slower mechanism or process can reduce the efficiency of the parallel loading process for all of the external data.

SUMMARY OF THE INVENTION

Embodiments of the invention provide for techniques to move data from data sources into a database system. A set of database commands may be provided to the database system. The database system may execute the database commands in order to perform steps for moving the data from the data sources into the target database system. The steps for moving the data may include collecting the data from data sources that are external to the database system, and durably storing the collected data in the database system. The steps for moving the data may also include performing a transformation on the collected data.

After receiving the set of database commands, the database system can execute the database commands to perform steps for moving the data into the database from external sources without accessing an external engine. Furthermore, the database system can execute the database commands to perform steps for moving the data into the database system without staging the data externally to the database system. The database system can also execute the database commands to perform steps for moving the data into the database system without ever staging the data, either internally or externally.

According to other embodiments, a database system that is the target of one or more ETL operations is configured to execute a plurality of processes concurrently. Each of the processes cause external data to be moved from a portion of the one or more external sources into the database system, so that execution of the plurality of processes concurrently moves data from different portions of the one or more external sources into the database system in parallel. Execution of the plurality of processes are coordinated from the database system.

The database system may correspond to a data warehouse. The data sources represent scattered arrangements of databases, servers, workstations, storage disks, and other storage mediums that are accessible to the database system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
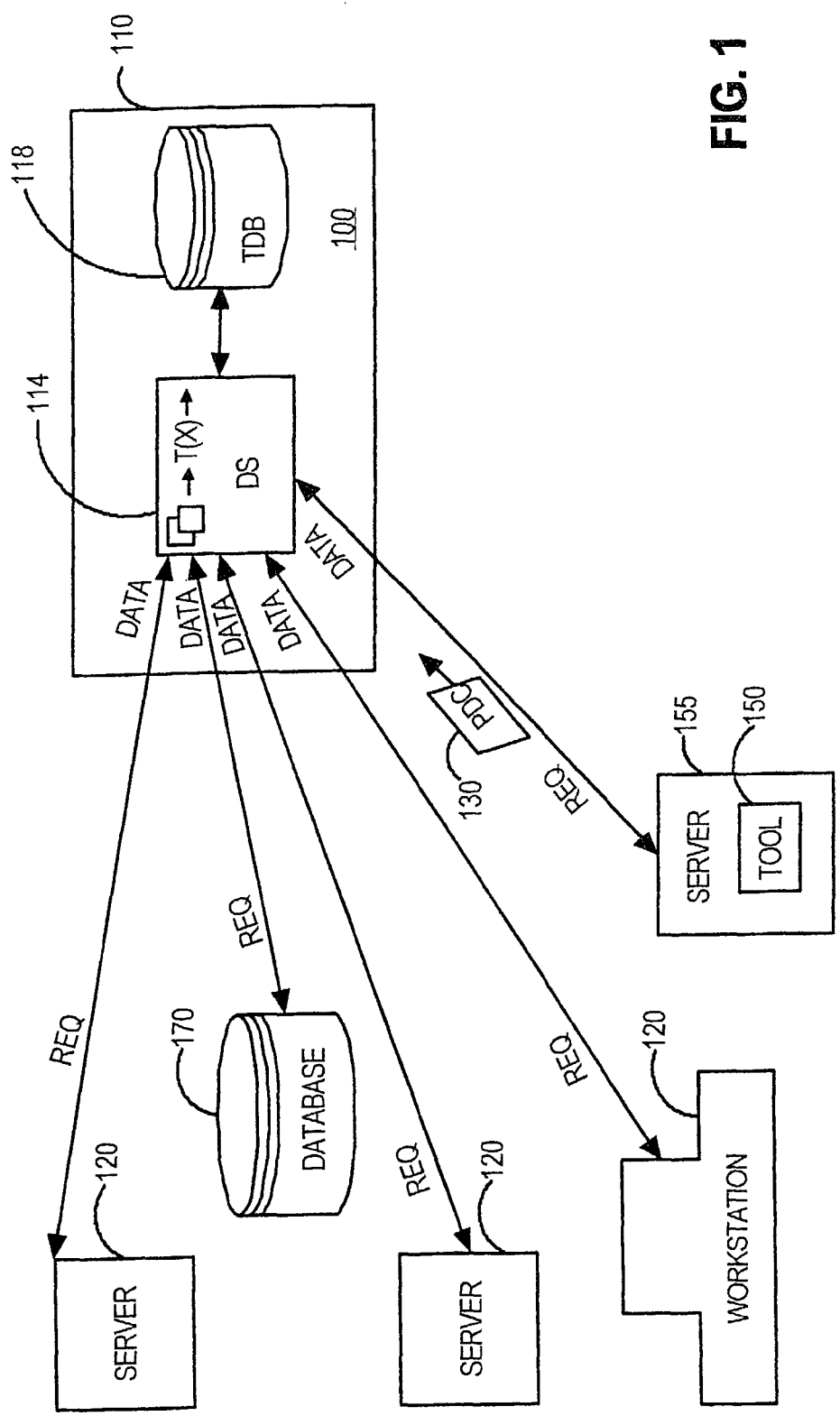
FIG. 1 is a system diagram of an embodiment of the invention.

A method and apparatus are described for moving data into a target database. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

DEFINITIONS

General definitions for some of the terms appearing in this application are as follows.

A database system is a combination that includes a server and a database. The server performs functions for accessing, manipulating or storing data in the database. The database refers to a medium that stores data, usually in a data structure. In an embodiment, the data structure may be a table. The database system can be one device that integrally combines the server and the database.

A "database command" is an instruction that is written in a database language and executable by a database system. Examples of database commands include Structured Query Language (SQL) statements.

A "data source" is any computer readable medium that stores data that can be collected by a database. Examples of data sources include spreadsheets, text files, flat files, and other databases.

"Staging" data refers to a process where data is stored in a medium that can persist until the data is actively removed. For example, staged data may persist until explicitly removed by a manual instruction, or by another process.

A "transformation" is any operation that alters data from a data source. For example, a transformation may include a combination of one or more commands that transform data from a first state to a second state. The commands used to implement a transformation may be in a database language. The transformation may range from simple to more complex.

The expression "durably storing" data means storing the data in a non-volatile medium that is the target destination for the data. When data has been durably stored, the data remains until explicitly modified or deleted by instructions. Thus, data that is written to disk temporarily during performance of a transformation operation is not durably stored since the data will be implicitly removed at the completion of the operation, while data that resides in staging tables is durably stored.

According to one embodiment, an external design tool determines the appropriate database language commands to effect specified transformations. Those commands may invoke a variety of functions to perform the transformations, each of which alter data collected from data sources in a different way. Specific examples of transformations that can be performed or invoked are provided below.

A "plan" is data that specifies how a user wants to move data from one or more data sources to a target database. The plan may include data specifying locations and identities of data sources, as well as any transformations that are to be performed on the data being extracted from those sources.

An "engine" is a component that can execute instructions to perform one or more operations. An ETL engine is a component residing on a computer system configured to perform the operations of extracting, transforming and loading data into a target database system. An ETL engine is said to be "intervening" if it resides externally to the target database system.

"Metadata" refers to information about data.

A "set" refers to one or more.

A "tool" is component that performs a set of functions. The tool may be executed by a computer system. In one embodiment, the tool is a software module.

A user-interface feature is a prompt, programmed to cause the user to make a choice. The user-interface features may correspond to display items, such as icons or menus, which can be selected to make a binary decision. Other examples of user-interface features include check-fields, query forms and auditory cues.

OVERVIEW

According to an embodiment, an external ETL tool does not act as intermediary during an ETL operation. Rather, during the ETL operation, data is moved into a database by causing the database system itself to execute one or more database commands that cause the database system to collect data from one or more sources that are external to the database. Next, the database system durably stores the collected data in the database system.

An embodiment avoids the overhead associated with staging the data by performing any transformations on the collected data before the data is durably stored in the database.

For example, the database system may be configured to store only a certain subset of the information collected from the data sources. A transformation may be implemented to cause data collected from the data sources to be parsed to identify the subset of information, without any staging internal or external to the database system. The subset thus identified may then be durably stored into the database system.

Among advantages provided by embodiments of the invention, a database system can be configured to perform steps that obviate the need for traditional ETL processes. In particular, a system such as described with embodiments of the invention removes the need to externally stage data collected from one or more data sources. Furthermore, the system removes the need for external engines that perform ETL processes on data being moved from data sources to the target database system.

Embodiments of the invention can be implemented using database commands. The database commands cause the database system to carry out complex operations with little programming skill or complexity. As a result, expenditures associated with hiring skilled programmers is saved, and fewer computer systems need to be trouble-shooted for errors. In addition, removing intermediate components that stage and/or perform ETL processes preserves communication bandwidth.

Another advantage provided is that the logic for implementing a plan is not scattered among external engines. Rather, the logic is encapsulated in a manner that allows the plan to be provided to and executed by numerous database systems. As a result, one plan can be simply implemented in multiple target databases, so that data from the data sources can be moved into multiple target databases using only one plan.

In addition, resources of a database system are leveraged in order to move data from external data sources into that database system. The database system can scale to accommodate large transfers of data.

SYSTEM DESCRIPTION

FIG. 1 is a system diagram for an embodiment of the invention. A system 100 includes a target database system 110 and a tool 150. The tool 150 may reside on any computer system, including the computer system on which the database server is executing 110. In the illustrated embodiment, the tool 150 is located on a server 155 that is remote relative to the target database system 110. The system 100 collects data from data sources 120. The data sources 120 may correspond to spreadsheets, text files, other databases, or any data stored on a computer readable medium.

Users use tool 150 to create a plan that indicates how the user wants data moved from the data sources 120 into the target database system 110. The tool 150 then creates a package 130 based on the user input. The tool 150 sends target database system 110 the package 130. The package 130 includes instructions that, when executed, cause target database system 110 to perform steps for moving data from the data sources 120 to target database system 110.

The target database system 110 includes a database server 114 and a target database 118. The database server 114 communicates with data sources 120 and tool 150. Specifically, the tool 150 sends package 130 to the database server 114 of target database system 110. The database commands of package 130 are executed on database server 114. Executing one or more database commands causes database server 114 to collect and durably store data from data sources 120. One or more commands of package 130 may, as an option, cause database server 114 to (1) create structures within the target database 118 into which the collected data is durably stored, and (2) perform one or more transformations on the collected data before the collected data is durably stored.

In one embodiment, a single database command may cause target database system 110 to perform steps of collected data from data sources 120, transforming the collected data, and storing the collected data in target database 118. The target database system 110 may have procedures loaded onto it that can be invoked by a single data command. For example, a single SQL statement may invoke a PL/SQL procedure on target database system 110 that causes it to perform the steps for collecting, transforming and storing the data from data sources 120.

TRANSFORMATIONS

A transformation T(x) may be implemented on data collected from data sources 120 before it is stored in target database 118. Collected data that is transformed may be durably stored in target database 118. The transformation is specified by one or more database commands in package 130.

In an embodiment, the transformation may be performed without staging the collected data. The collected data is durably stored after undergoing the transformations. According to another embodiment, data collected from data sources 120 is staged in database server 114. The transformation T(x) is performed on the collected data when the data is staged or structured. The output of the transformation is then stored in the target database 118. It is also possible for multiple transformations to be performed on the same set of collected data within target database system 110, either in series or in parallel.

The transformation(s) may be specific to one or more of data sources 120. For example, each data source 120 may store data as a different data type. The data collected by target database system 110 is in the data type of its data source 120 until transformed in target database system 110. Data collected by different data sources 120 may undergo different transformations to convert the data into a common data type for target database 118.

According to one embodiment, the transformation may be implemented on collected data to cause the collected data to be structured for storage in target database 118. For example, target database 118 may provide a table, where data is stored according to columns and rows. The target database 118 may maintain an index to manage the table, and to enable functions such as searching or updating to be performed on the table. The data collected from data sources 120 may need to be transformed in order to be stored in the table of target database 118. For example, data collected from one or more of data sources 120 may be converted into flat files that can be integrated into the table of target database 118.

In some applications, data collected from some types of data sources 120 may already be in the form of flat files. The transformation may be implemented on the flat files to integrate the flat files with the particular format of the target database's table. Metadata and other index information about the collected flat files can be integrated with the index for the table.

Numerous transformations are possible, and the transformations may vary to account for the types of data being collected from data sources 120. To provide additional examples, transformations may generally be used for (i) parsing collected data for select information, (ii) combining select data collected from data sources 120 with other data stored in target database system 110 or with data from other sources, or (iii) adjusting data collected from data sources 120 according to parameters or specifications stored in target database system 110. Some transformations may produce an output that needs to be staged within target database system 110 before it can be read into target database 118, or transformed again.

Specific examples of transformations that can be conducted in embodiments where target database 118 supports table functions. Table functions are functions which produce a set of rows as output. The set of rows produced by a table function may be treated as a "virtual" table. Thus, any database commands used for manipulating data in a table may be used to manipulate data produced by a table function.

User-defined table functions may be implemented with ORACLE 9i. Table functions may be used to execute a sequence of transformations before collected data is durable stored in target database 118. The transformations may be implemented using database commands, such as in PL/SQL. The results of the transformations may be materialized outside of the target database's table. In addition, table functions can be parallelized. Additional features for table functions may be found in the following patent applications, which are hereby incorporated by reference in their entirety, for purpose of providing additional teachings regarding table functions: METHOD AND SYSTEM FOR PIPELINED DATABASE TABLE FUNCTIONS, naming Ravi Murthy et al. as inventors, filed on Aug. 24, 2001, and having Ser. No. 09/938,982; and METHOD AND SYSTEM FOR PARALLEL EXECUTION OF TABLE FUNCTIONS, naming Ravi Murthy et al. as inventors, filed on Aug. 24, 2001, and having Ser. No. 09/939,311.

Figure 4:
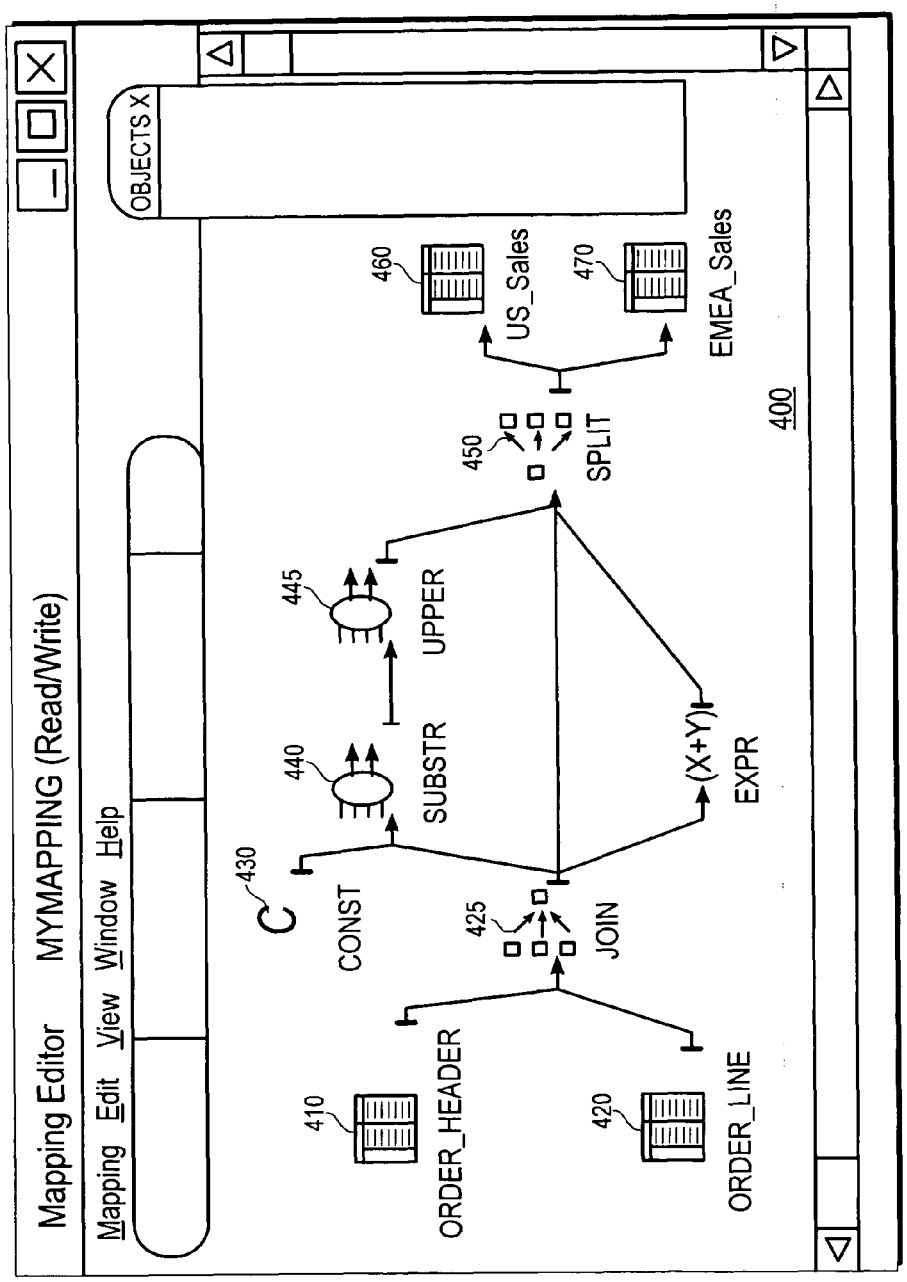
FIG. 4 illustrates a user-interface for designing a plan for moving data from one or more data sources into a target database system.

In another example, one or more of the data sources 120 may provide flat files. Data residing in flat files can be accessed using an "external table" feature. The external table feature allows the user to perform database operations on data that resides external to the database (e.g. flat files) as if the data resides in tables within the database. The data may be accessed using the external table feature. The transformed data may be loaded into a table of the target database 118 using a command such as INSERT, UPDATE or MERGE. FIG. 4 illustrates a user-interface under an embodiment of the invention, where specific table functions are selected as examples.

METHODS FOR MOVING DATA INTO TARGET DATABASE

Figure 2:
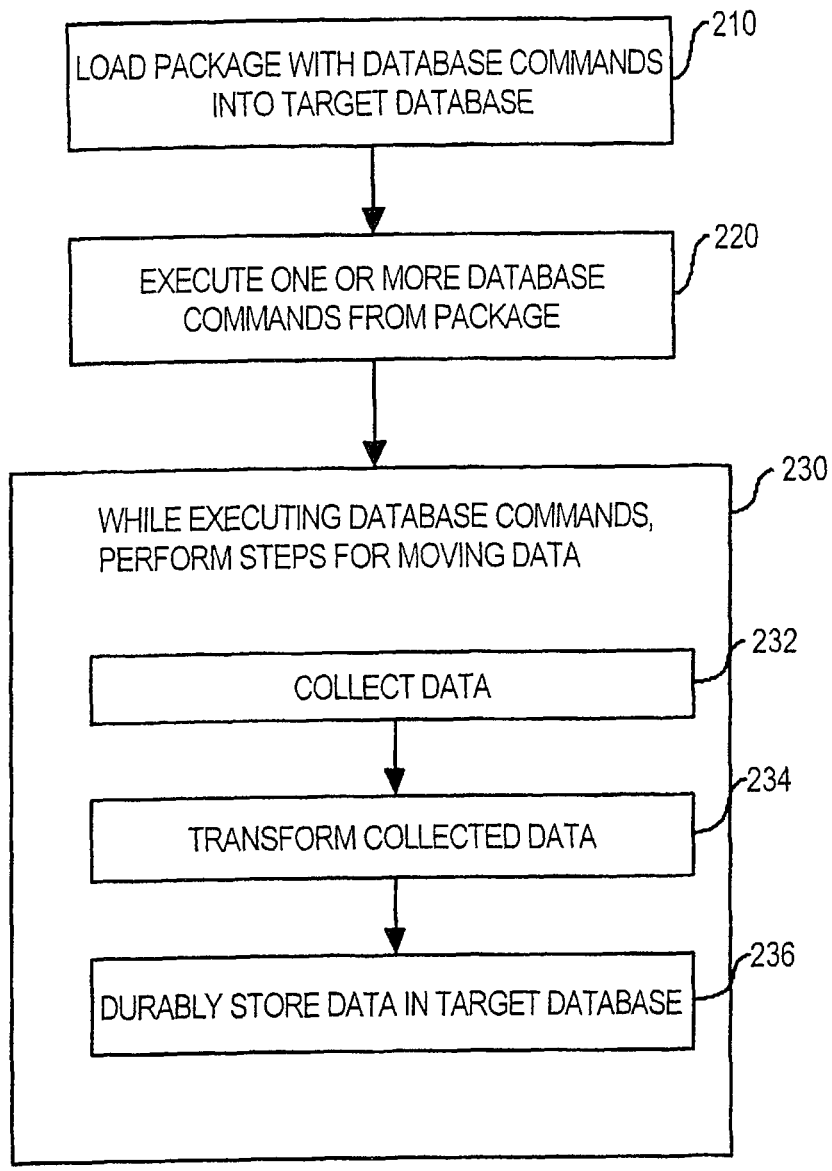
FIG. 2 illustrates a method for moving data from one or more data sources into a target database system, under an embodiment of the invention.

FIG. 2 illustrates a method for moving data into target database system 110. Reference to numerals of FIG. 1 is intended to illustrate examples for use with an embodiment of the invention.

In step 210, package 130 is loaded into target database system 110. The package 130 includes one or more database commands. The package 130 is produced by tool 150, on external server 155. The database commands within the package reflect how a user wishes to move data into target database system 110. FIG. 4 illustrates a sample user-interface of tool 150 for enabling users to specify how they want to move data into the target database.

In step 220, database server 114 executes one or more database commands of package 130.

Step 230 includes steps for collecting, transforming and durably storing data from data sources 120. These steps are performed in response to the database commands executed in step 220.

In step 232, data is collected from the one or more data sources 120. This may require causing database server 114 to access data sources 120. Data stored in data sources 120 is identified and transported to target database system 110. The collected data may include more data than what will actually be stored in target database system 110.

In step 234, one or more transformations are implemented on the collected data in target database system 110. This step may be optional, in that not all collected data needs to be transformed. The transformations may range from the simple to the more complex. Simple transformations may select portions of the data collected from data sources 120, and discard other portions.

Step 236 provides that collected data is durably stored in target database 118. Step 236 may occur concurrently with step 234, and/or with step 232. Specifically, portions of the collected data may be durable stored in target database 118 while other portions of the collected data are being transformed. Durably storing the collected data may require database server 114 to integrate the collected data into a table or other data structure of database 118. In addition, information about the collected data may be integrated into an index for the table.

To provide an example using FIG. 1, data sources 120 may correspond to Oracle and non-Oracle databases. The target database system 110 is loaded with package 130, which contains database commands for performing steps 232-236. The database server 114 of target database system 110 executes one or more of the database commands. As a result of executing the database commands, data on data sources 120 is identified and transported to the target database system 110.

In one embodiment, executing the database commands also causes data collected from data sources 120 to be transformed. Portions of the collected data may be discarded as a result of the transformation. Other portions of the collected data may be transformed into a common form. Executing the database commands causes the collected data to durably stored in target database 118. This may include integrating the collected data into a data structure of the target database 118. Portions of the collected data may be durably stored in the target database 118 while other portions of collected data are being transformed, so that data is transformed while being durably stored internally in the target database system 110.

In one embodiment, steps 232-236 are performed automatically, in response to target database system 110 executing one or more database commands in package 130.

PACKAGE CREATION

Figure 3:
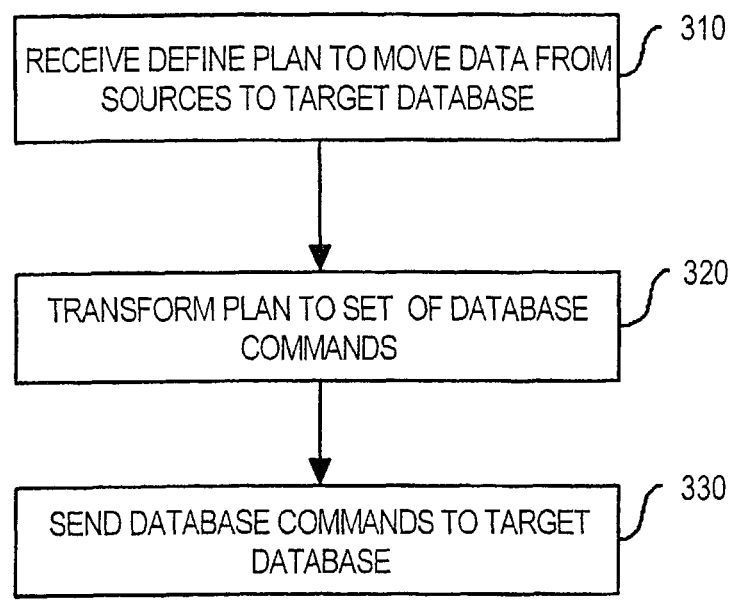
FIG. 3 illustrates a method for designing a plan on an external tool to cause a target database system to move data from one or more data sources into a target database.

FIG. 3 illustrates a method for instructing target database system 110 to move data from data sources 120 into the target database 118.

In step 310, tool 150 is used to create a plan for moving data into target database system 110. The plan may specify, for example, (i) which data sources 120 are to be used for retrieving data; (ii) what transformation, if any are to be implemented on the collected data; and (iii) how the collected data is to be stored in target database 118 of target database system 110. In step 320, an instruction package for target database system 110 is generated based on the plan. The instruction package includes one or more database commands.

For example, by interacting with the user interface illustrated in FIG. 4, a user can specify which data is to be collected, and how that data is to be transformed. Based on the input, the tool 150 generates a package that includes SQL commands. The SQL commands may be executed by target database system 110 to cause it to collect the data from the data sources 120, and to transform the collected data in the manner specified by the user.

In step 330, the instruction package is sent to target database system 110. The instruction package may be provided to target database system 110 so as to cause the target database system to execute one or more commands. As such, the instruction package may be sent to target database system 110 when the target database system is to collect data from data sources 120. Alternatively, the instruction package may be sent to target database system 110 and stored on database server 114. At some point in the future, or on a periodic basis, target database system 110 may execute one or more database commands in the instruction package to perform functions such as described with FIG. 2.

Significantly, tool 150 generates a package that enables target database systems to perform desired ETL operations, rather than attempting to coordinate the ETL operations itself. Consequently, the full power and sophistication of the target database systems may be leveraged during the ETL operations, including any ability the target database systems have to parallelize and load balance the work required by the operations. In addition, the package may be easily provided to numerous target databases in circumstances where it is desired that the same information be moved to each of several target databases.

USER-INTERFACE

FIG. 4 illustrates a user-interface 400 for use with an embodiment of the invention. The user-interface 400 may be provided on server 155 (FIG. 1), for tool 150 (FIG. 1). The user-interface 400 enables a user of target database system 110 to design a plan for collecting data from data sources 120 (FIG. 1), and for storing the collected data in target database 118. The plan may also specify one or more transformations that are to be performed on the collected data before the collected data is stored in target database 118. Embodiments of the invention provide that actions selected by the user in the plan are executed in target database system 110 (FIG. 1).

In FIG. 4, an exemplary plan is formed by arranging a plurality of user-interface features into an arrangement. The user-interface features include icons that are associated with functions for collecting data from data sources 120, for transforming the collected data, and for storing the collected data in target database 118.

The user-interface 400 enables a user to select a first icon 410 that designates a first external data collection, and to select a second icon 420 to designate a second external data collection. The first and second external data collection may correspond to tables or groups of flat files, residing on either the same of different external data sources 120. The first and second icons 410, 420 may be previously associated with locations and identifications of corresponding data sources 120, so that the selection of those icons for the plan cause tool 150 (FIG. 1) to write instructions for retrieving data from those data sources.

The user-interface 400 enables a user to select one or more transformations that are to be performed on data collected from data sources 120. A user may create a menu of icons, some of which correspond to transformations selected by the user. The details provided by the different transformations may be specified by the user. In addition, the order in which the transformations are to take place is selected as a feature of the plan.

In an example provided by FIG. 4, a first transformation icon 425 is selected to implement a first transformation of joining data collected from data sources 120 specified by first icon 410 and second icon 420. The output of the first transformation designated by first transformation icon 425 is a combination of all or portions of data collected from data sources 120 specified by the first and second icons 410 and 420.

A second transformation icon 430 is selected to implement a second transformation that inputs a constant into the output of the first transformation. The constant is a set of constant data items that can be merged to the output of the collected data after the first transformation is performed. For example, the constant data items may be a column of character strings, spelling "Mr."

A third transformation icon 435 is selected to implement a third transformation where rows of data outputted from the first transformation are combined in a logical manner. In this way, data collected from data sources 120 corresponding to first icon 410 and second icon 420 can be arranged into a table data structure selected by the user.

A sequence of transformations may be selected for the output of the second transformation. The sequence includes a fourth transformation, designated by fourth transformation icon 440, and a fifth transformation, designated by fifth transformation icon 445. The fourth transformation selects a substring from the output of the second transformation. The particular sub-string selected may be designated by the user beforehand. The fifth transformation causes at least a portion of that sub-string to be capitalized.

A sixth transformation designated by sixth transformation icon 450 splits the output provided by the second and fifth transformations. The manner in which the output from those transformations is split may be designated by the user. A portion of the data output by the transformations is sent to a first data structure of target database 118. Another portion of the data output by the transformations is sent to a second data structure of target database 118.

The target first data structure may be designated by the user using first target icon 460. The second target data structure may be designated by the user using second target icon 470. In a configuration step, the user may identify and associate the specific data structures of target database 118 to the first and second target icons 460 and 470. The first and second data structures may, for example, be tables.

All of the transformations and steps for storing data collected from data sources 120 are performed in target database system 110. The plan can be designed on tool 150 (FIG. 1), which may be located on server 155, external to target database system 110. However, other embodiments provide that the plan can be designed by a user directly interfacing with target database system 110.

PARALLEL TRANSFER OF DATA FROM ONE OR MORE EXTERNAL SOURCES INTO A DATABASE SYSTEM

Embodiments of the invention enable parallel transfer of data into a target database system during ETL operations. The parallel transfer of data is coordinated through the target database system, rather than through components that are independent of the target database system. The result is that external data may be efficiently moved in parallel into the target database system during ETL operations.

Among other advantages, embodiments of the invention reduce the time that would otherwise be required to transfer external data into the target database system. The overall efficiency of moving external data into the target database system is improved when external data is loaded in parallel and coordinated through the target database system. Since the target database system coordinates the external, parallel transfer, the parallel transfer may be accomplished without problems such as those present in prior art systems. For example, problems such as contention amongst data items being loaded into the target database system, and fragmentation of data as a result of holding the data in temporary storage, are avoided.

Figure 5:
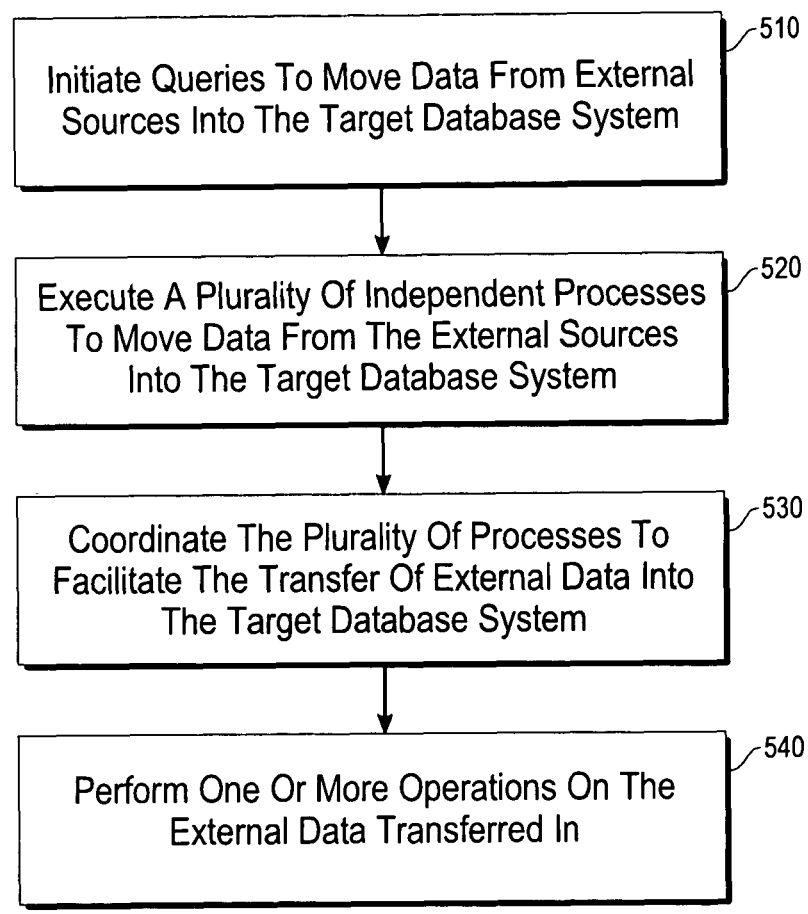
FIG. 5 illustrates a basic method for moving data in parallel from one or more external sources into a target database system.

FIG. 5 illustrates a basic method for moving data in parallel from one or more external sources into a target database system. A method such as described in FIG. 5 is able to coordinate the parallel transfer of data through the target database system receiving the data.

In step 510, one or more queries are initiated to move data from one or more external sources into the target database system. The queries are initiated from the target database system. In other words, the target database system will pull data from the external sources. The queries may be executed in response to a user-request, or to a predetermined event. For example, the target database system may be configured to perform ETL operations, including the parallel transfer of data from the external sources, at particular times in a day or week.

In step 520, a plurality of processes are executed to move data from the one or more external sources into the target database system. Each process performs a set of operations that operate independently of the other processes.

In step 530, the target database system coordinates the plurality of processes to facilitate the transfer of the external data into the target database system. The target database system determines the portions of the external data that are to be extracted by each process. The target database system may determine the portions of the external data that are to be extracted both (i) at the onset, such as before data from the external sources has been transferred in, and (ii) continuously after the onset, such as when some or all of the processes are being executed.

In one embodiment, the target database system performs operations for load balancing the extraction of external data. For example, if one process completes extracting data from its designated portion before another process, the remaining portions of the uncompleted process may be split between the two available processes.

In step 540, one or more operations are performed on the external data transferred in. The operations may include storing the external data in permanent internal data structures, such as tables stored within the target database system. Operations may analyze or perform logical operations on the external data once that data is within the target database system, either before or after the external data is incorporated into the permanent data structure. Other examples of operations that may be performed on the external data include building, maintaining, and/or combining indexes for the incoming data.

Figure 6:
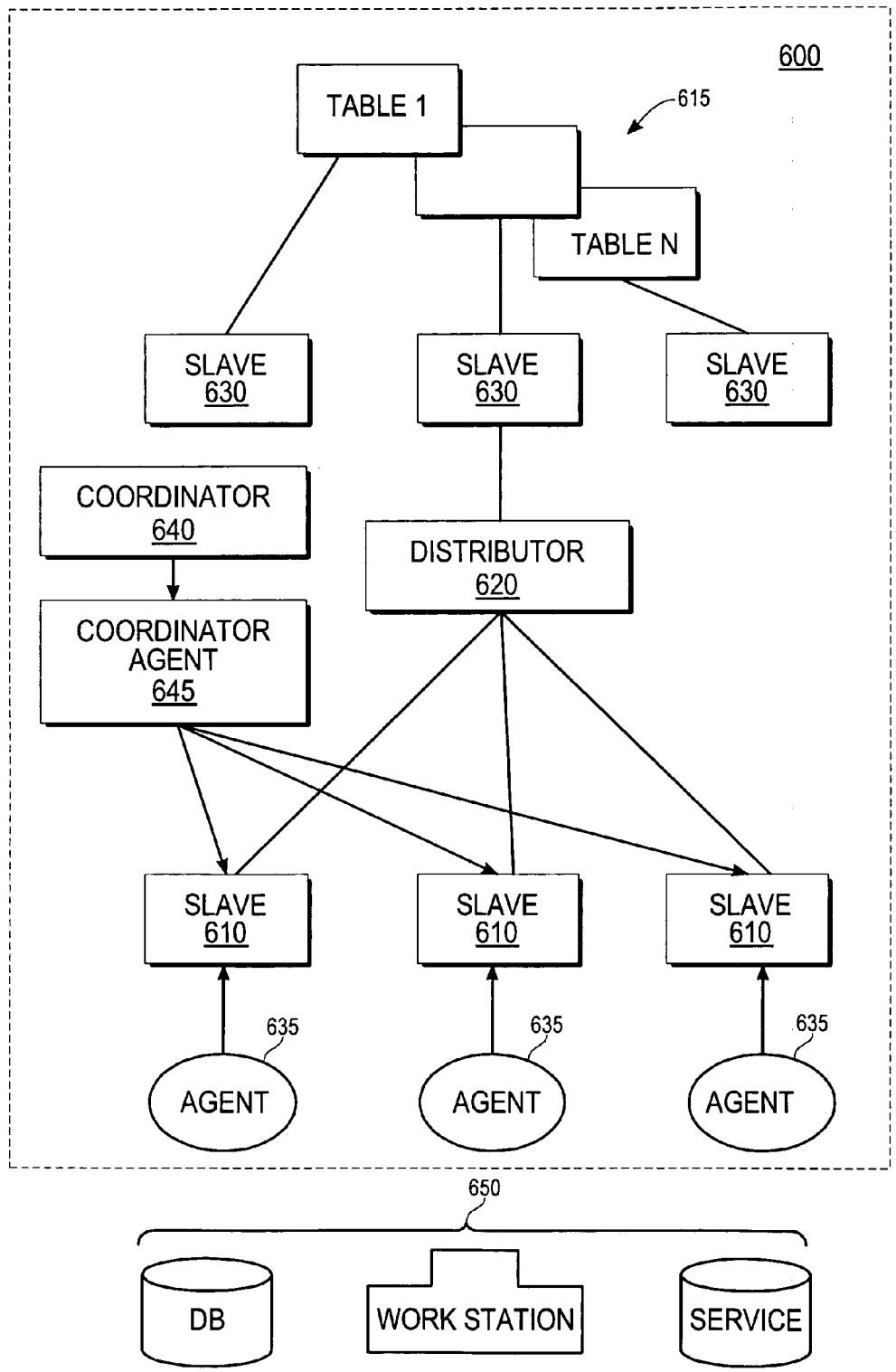
FIG. 6 is a block diagram of a database system configured to enable parallel transfer of data from external sources into the target database system.

FIG. 6 is a block diagram of a database system configured to enable parallel transfer of data from external sources into the target database system. According to an embodiment, database system 600 is assumed to manage one or more database structures, such as tables 615. The tables 615 may contain data retrieved from one or more external sources 650. The database system 600 may be operated to enable data from the external sources 650 to be transferred into the target database system 600 in parallel. In addition, database system 600 may be operated to perform logical operations on the data being moved into the database system prior to or independently of storing that data as part of the tables 615.

In an embodiment, database system 600 includes, as logical components, a plurality of external-side slave components 610, a distributor 620, and a plurality of database-side slave components 630. The external-side slave components 610 manage the extraction of data from the external sources 650. The distributor 620 assigns external data to specific tables 615. The database-side slave components 630 cooperate with the distributor 620 to write the external data into the tables assigned to specific external data.

In one embodiment, external sources 650 are computer systems (i.e. databases, workstations and servers) that retain tables, flat files or other row-structured data. The external sources 650 may reside at different physical and logical locations, but still be accessed concurrently by the target database system 600.

Each external-side slave component 610 communicates with one or more agents 635. Each agent 635 is a component configured specifically for reading or otherwise extracting data from a particular external data source or type. For example, agents 635 may utilize knowledge of data formats for data stored in a particular external source, or of path information for locating such data within the particular external source. The agents 635 operate at the command of other components. In an example such as shown by FIG. 6, agents 635 operate at the command of external-side slave components 610.

A coordinator 640 is configured to coordinate the parallel transfer of external data into the target database system 600. The coordinator 640 cooperates with a coordinator agent 645 in order to manage operations of the external-side slave components 610 and the agents 635. The database side slave components 630 cooperate with the distributor 620 to write the external data into the table or partitions of the table assigned for which the database side slaves are assigned to maintain.

Each agent 635 may be an integrated part of a corresponding external-side slave component 610. In this type of configuration, one of the slave components 610 may invoke its corresponding agent 635 through commands such as function calls. In other embodiments, one or more agents 635 may be distributed and external to the target database system 600. Specifically, each agent 635 may reside at the location of its corresponding external data source, and communicate with the corresponding slave component 630 through commands such as remote procedure calls. Still further, in other embodiments, agents 635 and slave components 610 may be integrated logical components.

Separating agents 635 into distinct logical components from slave components 610 may be advantageous in that the target database system 600 may be able to process data from different types of external data sources. The slave components 610 may be provided with individual application program interfaces (APIs). Agents 635 may be configured to read data from specific external data sources, and to communicate with the corresponding slave component 610 through that slave component's API. This type of architecture enables a more diverse range of agents 635 to communicate and be used by target database system 600, as the manner in which agents 635 communicate with the slave components 610 may be uniform and implemented modularly.

According to one embodiment, when queries to transfer data from the one or more external data sources 650 into target database system 600 are initiated, coordinator 640 activates coordinator agent 645. The coordinator agent 645 identifies stored information about the one or more external sources 650. The coordinator agent 645 uses the stored information about the external sources 650 to form a plan to divide the external data sources for parallel data transfer. The coordinator agent 645 may also use the stored information to granularize the data from the one or more external sources 650 into portions that are to be transferred in parallel with one another.

In an embodiment, the stored information that the coordinator agent 645 uses to form the plan is user-defined metadata. The information also serves to identify a format of the external data. For example, the information may identify the character set and type of delimitation characteristics used by the external data source. In addition, the information locates the external data source both physically and logically. For example, the file path and/or network address of files being used for external sources may be included in the information identified by the coordinator agent 645. Other attributes of the external data or data source that may be identified and used by the coordinator agent 645 include attributes that indicate whether an external file is a random access file, and whether multiple processes can access the file concurrently. For example, pertinent characteristics of the external sources include whether the external data sources can be read sequentially, whether the data sources permit random, non-sequential operations, and whether the data sources permit concurrent access. All of these characteristics may be used by coordinator agent 645 to form the plan. In an embodiment, this information may be stored on the database system by the user.

When queries to transfer data from the one or more external data sources 650 into target database system 600 are initiated, slave components 610 activate corresponding agents 635. Each agent 635 is configured to read data from one of the external sources 650, at the direction of one of the slave components. In order to extract data from a corresponding one of the external sources 650, each agent 635 may be configured to (i) read data in the format of the corresponding external source, and (ii) reformat the external data into the format of the tables 615. In addition, the configurations of each agent 635 may account for access paths to the external source, including logical addresses and memory addresses. Each of the slave components 610 communicates with a corresponding agent 635 to (i) call the corresponding agent; (ii) signal extraction commands to the corresponding agent; and (iii) transport extracted data into the target database system.

The distributor 620 coordinates one of the database-side slave components 630 with one of the external-side slave components 610. The database-side slave components 630 write data into designated partitions or portions of tables 615. For example, the distributor 620 or one of the database-side slave components 630 may use stored information on the target database system 600 to identify a partition where newly extracted external data is to be stored.

Figure 7:
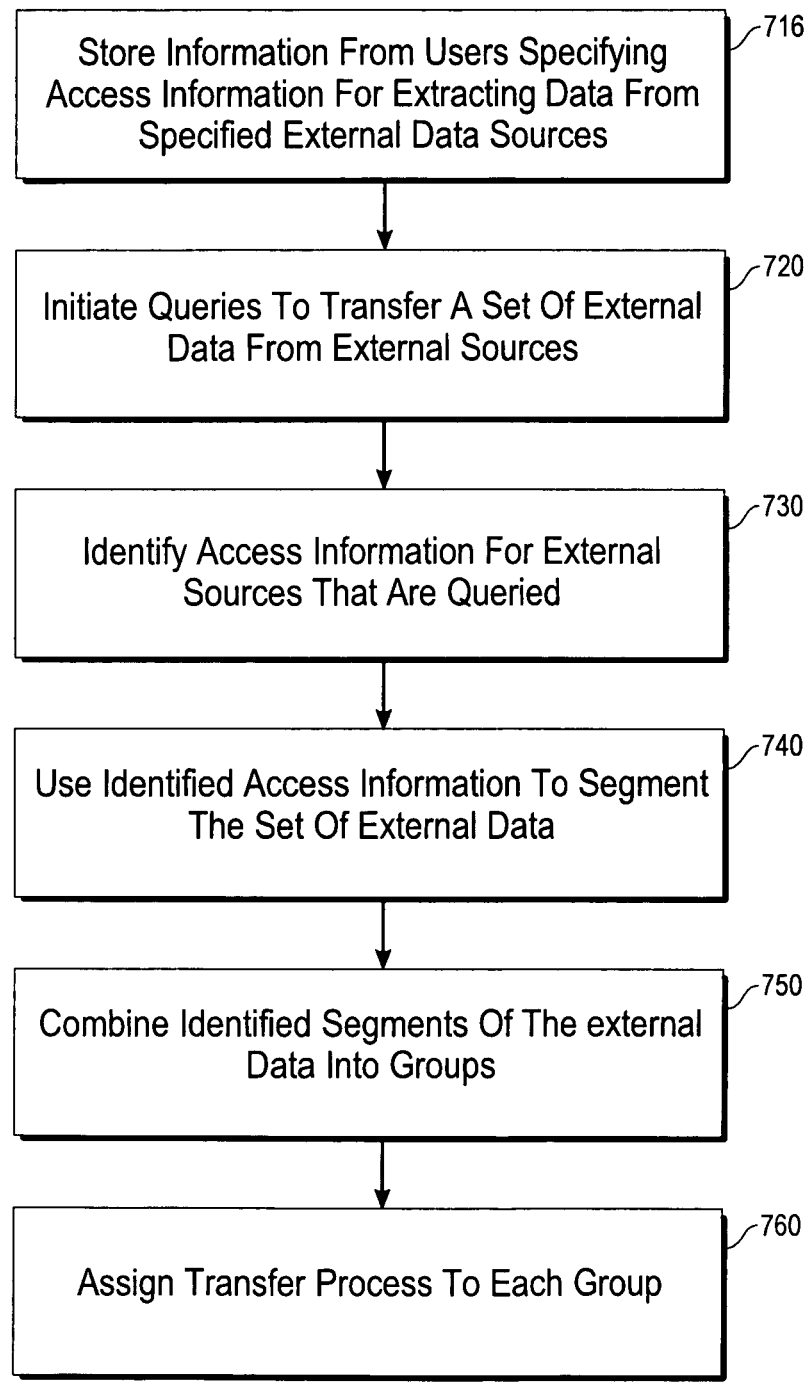
FIG. 7 is a method illustrating operations of a target database such as shown in FIG. 6 for purpose of accomplishing parallel transfer of data from one or more external data sources to the target system.

FIG. 7 is a method illustrating operations of a target database such as shown in FIG. 6 for purpose of accomplishing parallel transfer of data from one or more external data sources to the target system, under an embodiment of the invention. Reference to numerals of FIG. 6 are made to illustrate exemplary components for practicing embodiments of the invention.

In step 710, target database system 600 receives access information from users. The access information is for extracting data from one or more specified external data sources. The access information may be entered at any time prior to the data from the external sources being transferred into the target database system 600. For example, the access information may be entered once, and subsequently used in a periodic fashion to load data from the same external sources. The access information provided by the user may be stored in the form of metadata. In an embodiment such as shown by FIG. 6, metadata is used by the coordinator agent 645 to load data from specific external sources. According to embodiments described herein, the metadata provided by the user may specify (i) the format of the external data, including the character type and/or delimiting characteristics of the external data source; (ii) location of the external source, including network location and/or file path; and/or (iii) certain attributes of the file, such as whether it is a random access file or whether the external source can be accessed by multiple processes at the same time.

In step 720, target database system 600 executes a query to transfer a set of external data from the external sources into the target database system 600. The query may be initiated by a user, or it may be initiated programmatically, such as by way of a periodic ETL operation to load data from designated external sources. In either case, the server requests data from the external sources, so that when the ETL operation is performed, data is pulled in parallel from the external sources.

In step 730, access information is identified for extracting data from the external sources being queried. For example, target database system 600 may be configured to initiate a query to extract data from designated external sources periodically. At each instance when the query is initiated, the target data system 600 may access a set of stored metadata corresponding to access information for use by coordinator agent 645. According to an embodiment, the component that accesses the set of metadata in target system 600 is coordinator agent 645, when it is initiated by coordinator component 640.

In step 740, access information identified in step 730 is used to segment the set of external data. The one or more external sources are segmented into independent units of access. According to an embodiment, the segmentation of the external sources is based on considerations that include making each unit of access large enough to mitigate resource costs for accessing that segment independently, and on making each unit of access small enough to achieve a high order of parallelism. Thus, the performance and bandwidth available to the target database system may be factored into determining the number of segments created from the set of external data that is to be transferred into the target database system.

Files containing external data that are to be transferred into the target database system 600 may be segmented internally into independent units of access if the structure of the file containing the external data has identifiable delimitation characteristics indicating where data can be parsed within the file. Whenever possible, the delimitation characteristics may be used to facilitate the segmentation of the external data into relatively equal sized independent units of access.

The external data that is to be transferred in may also be segmented by designating individual external files containing the external data as the independent units of access. This may be necessary when the files containing the external data have no identifiable delimitation characteristics.

Step 750 provides that identified segments, or independent units of access identified in step 740, are combined into a plurality of groups. Identifying groups may be part of an overall division plan performed by coordinator component 640.

In step 760, a transfer process is assigned to each group formed in step 740. Each transfer process is responsible for reading external data from its corresponding group of segments into the target database system 600. The transfer processes may be performed by the slave components 610 controlling the agents 635.

To illustrate by way of example, two external tables located at separate locations may contain data that is to be loaded into target database system 600 during an ETL process. The two external tables may each be segmented into ten independent units of access, so that the ETL process is to transfer the external data into the target database system 600 as twenty total segments. The twenty independent units of access may be grouped into four groups. Four independent transfer processes may be created to read external data from each group. Thus, parallel transfer of external data is achieved by reading external data from the four groups of segmented external data concurrently.

One exemplary manner in which an agent 635 may be controlled in reading data from the external sources is illustrated herein. The slave component 610 for a particular group issues a "start" command to its agent 635. Next, the slave component 610 issues a "fetch init" command to initialize a subsequent fetch process that marks the beginning of a segment in that group. Next, one or more "fetch" commands are issued to the agent 635 to cause the agent to read data from an identified segment. When the end of a segment is reached, another "fetch init" command is issued to the agent 635 for another segment in the group. This is followed by one or more "fetch" commands, to extract data from the next segment. When data from all segments have been extracted in this manner, a "close" command is issued to the agent 635, and the agent 635 is closed.

Figure 8:
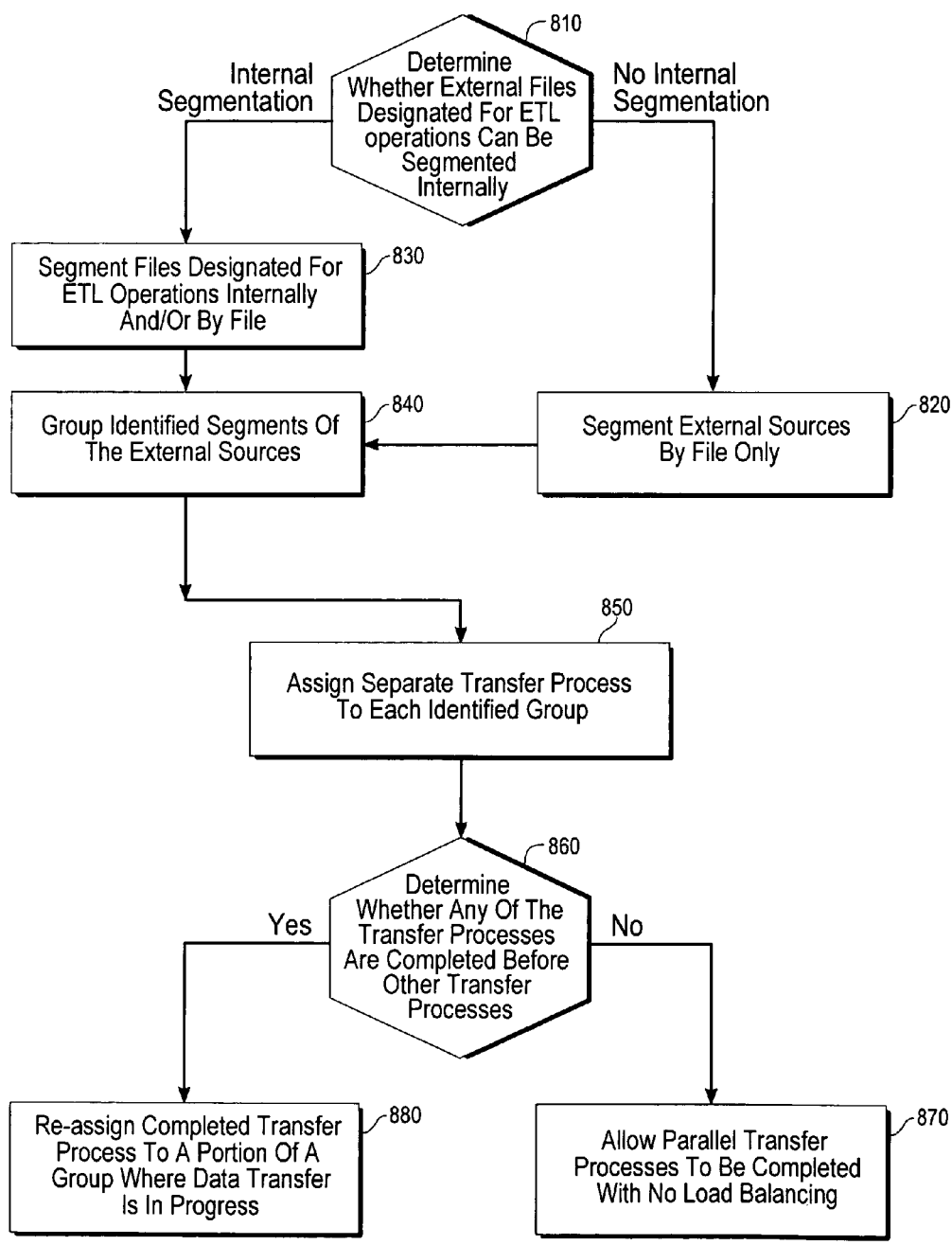
FIG. 8 illustrates a load-balancing technique to facilitate loading external data in parallel into a target database system.

FIG. 8 illustrates a load-balancing technique to facilitate loading external data in parallel, under an embodiment of the invention. Reference to numerals of FIG. 6 are made to illustrate exemplary components for practicing embodiments of the invention.

In step 810, a determination is made as to whether an external file designated for ETL operations can be segmented internally using delimitation characteristics.

If no delimitation characteristics are determinable, parallel transfer of data would require multiple external files. If multiple external files exist for the ETL process being initiated, step 820 provides that the external files designated for the ETL process are segmented by file only. For example, it three external files are designated for the ETL process, each segment may correspond to one of the external files.

If delimitation characteristics are determinable, step 830 provides that the external files designated for the ETL process are segmented internally and/or by file. The segments forming each group may be ordered within that group so that subsequent transfer of data amongst segments in that group is accomplished in the designated order. The order in which the segments are to be used may be determined in various ways, such as by the order of how the data is stored in a corresponding external file.

Following step 820 or 830, step 840 provides that identified segments of the external files are grouped. The groups may be identified based on a division plan formed by coordinator component 640, to divide the intake of external data among an optimal number of independent processes.

Step 850 provides that a separate independent transfer process is assigned to each grouping of external file segments, and the ETL process is initiated. Each transfer process is performed by one slave component 610, and one or more agents 635. Therefore, each transfer process may extract data from multiple identified segments. It is possible for slave component 610 to utilize multiple agents 635 to extract data from a group of identified segments, especially if anyone group includes data that is part of two or more external files. Each transfer process may extract data from segments of each group according to the order specified for the segments.

In step 860, a determination is made as to whether one of the transfer processes assigned in step 850 is completed while any other transfer in progress has one or more whole segments remaining to transfer into the target database system 600. For example, a first transfer process may extract data from all of the segments assigned to its group, while a second transfer process still has two of four segments remaining in the transfer process, where one of the two remaining segments is being worked on by the second transfer process.

If the determination in step 860 is negative, then step 870 provides that the parallel transfer process is allowed to be completed with no load balancing between the transfer processes.

If the determination in step 860 is positive, then load balancing may be used to make the overall parallel transfer of the external data faster. In step 880, the completed transfer process is re-assigned to a portion of a group still undergoing data transfer, as identified in step 860. The remaining portion of the un-completed group is divided again, giving the available transfer process one or more segments in that group, and the transfer process originally assigned to that group is left with fewer segments to operate on.

Step 880 is repeated for different groups, or even repeatedly for the same group, until the transfer of data from the groups of external data to the target database system 600 is complete.

A method such as described with FIG. 8 may be performed dynamically. Rather than designating groups of segments to each process, each transfer process may initially be assigned a small portion or granule of all of the data that is to be transferred in. When the process completes a granule, it will seek out another granule. When the ETL operations are completed, one transfer process may have completed transferring more granules into the database system than another process. In this way, data skew and overloading problems caused by one process being more or less efficient than other processes are avoided.

HARDWARE OVERVIEW

Figure 9:
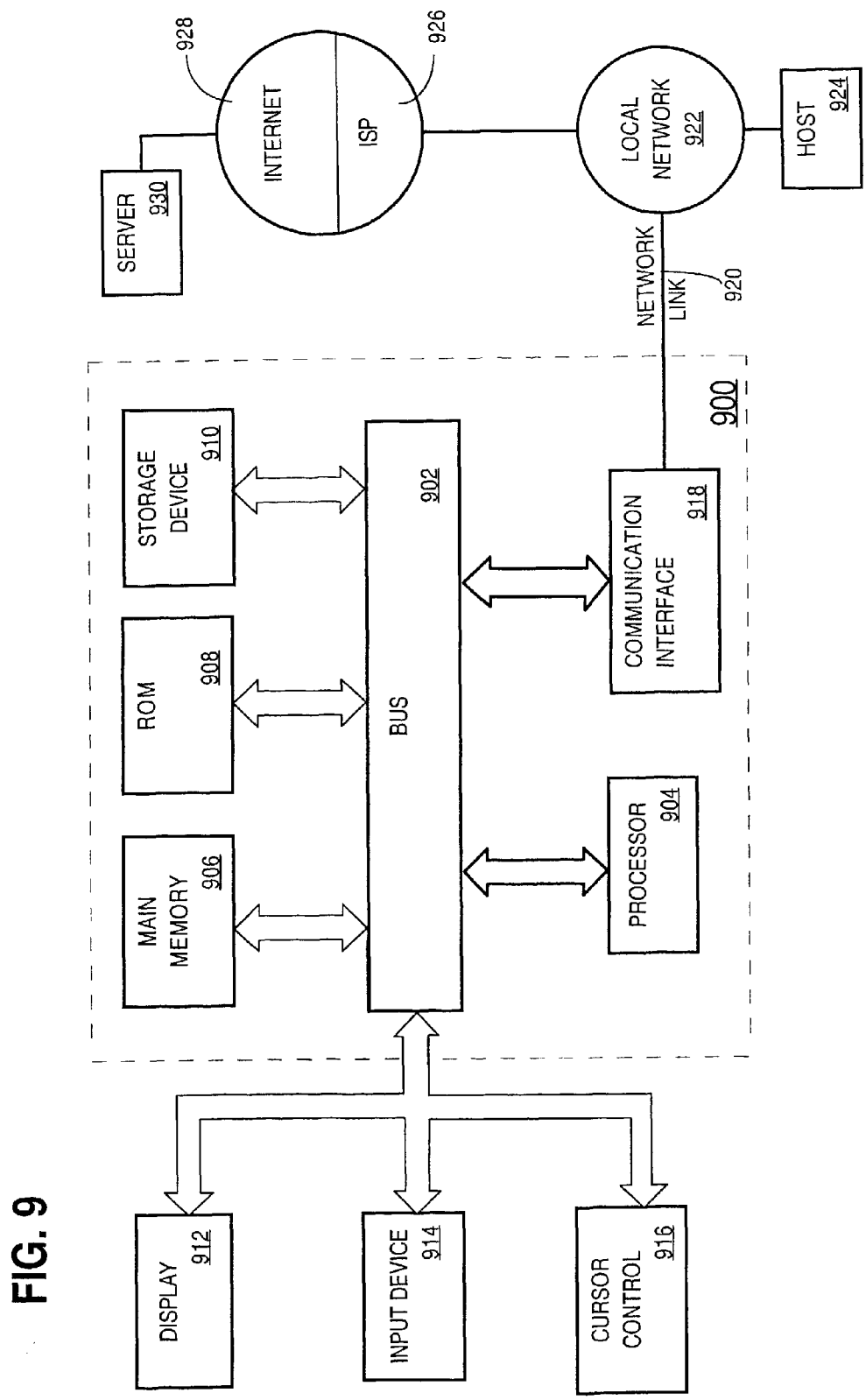
FIG. 9 is a block diagram that illustrates a computer system upon which an embodiment of the invention may be implemented.
Figure 10:
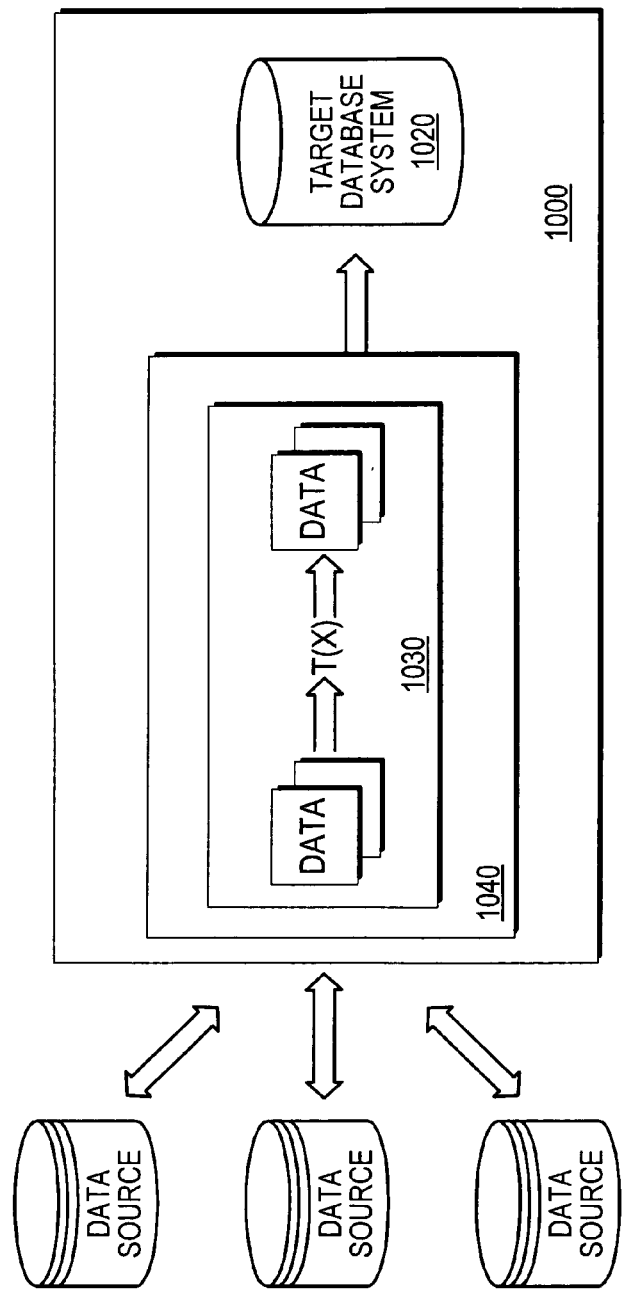
FIG. 10 illustrates a known system for performing extraction, transformation, and loading of data from data sources into a target database.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red send. An infra-red detector can receive the data carried in the infra-red send and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical sends that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical sends that carry digital data streams. The sends through the various networks and the sends on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution. In this manner, computer system 900 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for moving data, into a database system that includes a database server and a database, from one or more external sources external to the database, the method comprising:
    the database server executing a database command that specifies movement of the data from said one or more external sources into said database, wherein executing the database command comprises:
        the database server segmenting the data on the one or more external sources into a first plurality of segments that collectively cover the data specified by the database command, wherein segmenting the data comprises segmenting a single file, that is stored on an external source of the one or more external sources, into a second plurality of segments that is included in the first plurality of segments, wherein the second plurality of segments cover an entirety of the single file, and wherein segmenting the single file is based at least in part on a data format of the single file; and
        the database server executing a plurality of processes concurrently, wherein each process of said plurality of processes is assigned to move data from a different segment of said first plurality of segments into the database system.

2. The method of claim 1, further comprising performing one or more operations on the data moved from the one or more external sources into the database system.

3. The method of claim 2, wherein performing one or more operations includes incorporating the data moved from each of the one or more external sources into one or more target tables stored by the database system.

4. The method of claim 2, wherein performing one or more operations includes executing logic to analyze the data once the data is moved from each of the one or more external sources into the database system.

5. The method of claim 4, wherein performing one or more operations includes incorporating at least some of the data from the one or more external sources into one or more tables maintained in the database system after executing the logic to analyze the data.

6. The method of claim 1, wherein segmenting the data on the one or more external sources into the first plurality of segments includes using information specified by a user to determine at least some of the first plurality of segments.

7. The method of claim 1, wherein segmenting the single file based on the data format of the single file includes:
    determining if a first external source in the one or more external sources has identifiable delimiters to delimit data within the first external source,
    if the first external source has identifiable delimiters, using one or more of the delimiters to segment that external source into multiple segments.

8. The method of claim 1, further comprising:
    detecting that at least one process in the plurality of processes completes moving data into the database system;
    reassigning at least a portion of the segments assigned to a plurality of processes which have not completed moving data into the database system to the processes which have completed moving data into the database system.

9. The method of claim 8, wherein the reassigning breaks down at least one segment belonging to a first particular process which has not completed moving data into the database system into a plurality of sub-segments and assigns at least one sub-segment to the first particular process and at least another sub-segment to a second particular process which has completed moving data into the database system.

10. The method of claim 1, further comprising the database server coordinating execution of the plurality of processes in order to reduce a time gap between when each of the plurality of processes are completed.

11. The method of claim 1, wherein segmenting the data on the one or more external sources into the first plurality of segments includes using one or more attributes of each of the one or more external sources to segment the data.

12. The method of claim 11, wherein using one or more attributes of each of the one or more external sources to segment the data includes determining at least one of (i) whether each of the external sources allows concurrent access to data stored in that external source, (ii) whether each of the external sources allow random, non-sequential operations to be performed on data in that external source.

13. The method of claim 1 wherein the database command specifies at least one external table.

14. A database system for retrieving data from one or more external sources, the database system comprising:
    a memory to store one or more target tables; and
    one or more processors configured to:
    execute a database command that specifies movement of the data from said one or more external sources into said database system, wherein executing the database command comprises:
        segmenting the data on the one or more external sources into a first plurality of segments that collectively cover the data specified by the database command, wherein segmenting the data comprises segmenting a single file, that is stored on an external source of the one or more external sources, into a second plurality of segments that is included in the first plurality of segments, wherein the second plurality of segments cover an entirety of the single file, and wherein segmenting the single file is based at least in part on a data format of the single file; and
        executing a plurality of processes concurrently, wherein each process of said plurality of processes is assigned to move data from a different segment of said first plurality of segments into the database system;

incorporate the data moved from the one or more external sources into the one or more target tables.

15. The database system of claim 14, wherein the one or more processors are configured to execute one or more agents residing on the database system in order to read data from the one or more external sources.

16. The database system of claim 14, wherein the one or more processors are configured to communicate with one or more agents residing externally to the database system in order to read data from the one or more external sources.

17. The database system of claim 16, wherein the one or more processors are configured to perform one or more operations on the data moved from the one or more external sources prior to incorporating the data into the one or more target tables.

18. The database system of claim 14, wherein the one or more processors are configured to perform a load balancing technique to reduce a time gap between when each of the plurality of processes competes moving data from the segment assigned to that process.

19. A non-transitory computer readable storage medium storing instructions for moving data, into a database system that includes a database server and a database, from one or more external sources external to the database, the instructions comprising:

the database server executing a database command that specifies to movement of the data from said one or more external sources into said database, wherein executing the database command comprises:

the database server segmenting the data on the one or more external sources into a first plurality of segments that collectively cover the data specified by the database command, wherein segmenting the data comprises segmenting a single file, that is stored on an external source of the one or more external sources, into a second plurality of segments that is included in the first plurality of segments, wherein the second plurality of segments cover an entirety of the single file, and wherein segmenting the single file is based at least in part on a data format of the single file; and the database server executing a plurality of processes concurrently, wherein each process of said plurality of processes is assigned to move data from a different segment of said first plurality of segments into the database system.

20. The non-transitory computer readable storage medium of claim 19, further comprising instructions for performing one or more operations on the data moved from the one or more external sources into the database system.

21. The non-transitory computer readable storage medium of claim 20, wherein instructions for performing one or more operations include instructions for incorporating the data moved from each of the one or more external sources into one or more target tables stored by the database system.

22. The non-transitory computer readable storage medium of claim 20, wherein instructions for performing one or more operations include instructions for executing logic to analyze the data once the data is moved from each of the one or more external sources into the database system.

23. The non-transitory computer readable storage medium of claim 22, wherein instructions for performing one or more operations include instructions for incorporating at least some of the data from the one or more external sources into one or more tables maintained in the database system after executing the logic to analyze the data.

24. The non-transitory computer readable storage medium of claim 19, wherein instructions for segmenting the data on the one or more external sources into the first plurality of segments includes using information specified by a user to determine at least some of the first plurality of segments.

25. The non-transitory computer readable storage medium of claim 19, wherein instructions for using the data format of the data on the one or more external sources to determine the first plurality of segments includes:

determining if a first external source in the one or more external sources has identifiable delimiters to delimit data within the first external source, if the first external source has identifiable delimiters, using one or more of the delimiters to segment that external source into multiple segments.

26. The non-transitory computer readable storage medium of claim 19, further comprising instructions for:

detecting that at least one process in the plurality of processes completes moving data into the database system;

reassigning at least a portion of the segments assigned to a plurality of processes which have not completed moving data into the database system to the processes which have completed moving data into the database system.

27. The non-transitory computer readable storage medium of claim 26, wherein the reassigning breaks down at least one segment belonging to a first particular process which has not completed moving data into the database system into a plurality of sub-segments and assigns at least one sub-segment to the first particular process and at least another sub-segment to a second particular process which has completed moving data into the database system.

28. The non-transitory computer readable storage medium of claim 19, further comprising instructions for the database server coordinating execution of the plurality of processes in order to reduce a time gap between when each of the plurality of processes are completed.

29. The non-transitory computer readable storage medium of claim 19, wherein instructions for segmenting the data in the one or more external sources into a first plurality of segments includes using one or more attributes of each of the one or more external sources to segment the data.

30. The non-transitory computer readable storage medium of claim 29, wherein instructions for using one or more attributes of each of the one or more external sources to segment the data include instructions for determining at least one of (i) whether each of the external sources allows concurrent access to data stored in that external source, (ii) whether each of the external sources allow random, non-sequential operations to be performed on data in that external source.

31. The non-transitory computer readable storage medium of claim 19 wherein the database command specifies at least one external table.

* * * * *

UNITED STATES PATENT AND TRADEMARK OFFICE
CERTIFICATE OF CORRECTION

PATENT NO.        : 8,606,744 B1                                    Page 1 of 1
APPLICATION NO.   : 10/159812
DATED             : December 10, 2013
INVENTOR(S)       : Dageville et al.

It is certified that error appears in the above-identified patent and that said Letters Patent is hereby corrected as shown below:

In the Claims

In column 21, line 29, in Claim 19, delete "specifies to" and insert -- specifies --, therefor.

Signed and Sealed this
Eighth Day of July, 2014

Michelle K. Lee
*Deputy Director of the United States Patent and Trademark Office*